United States Patent
Reimchen

(10) Patent No.: US 9,429,194 B2
(45) Date of Patent: Aug. 30, 2016

(54) ROLLING ELEMENT GUIDE CAGE AND METHOD FOR PRODUCING SAME

(71) Applicant: Schaeffler Technologies GmbH & Co. KG, Herzogenaurach (DE)

(72) Inventor: Alexander Reimchen, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 32 days.

(21) Appl. No.: 14/390,209

(22) PCT Filed: Feb. 12, 2013

(86) PCT No.: PCT/EP2013/052722
§ 371 (c)(1),
(2) Date: Oct. 2, 2014

(87) PCT Pub. No.: WO2013/156173
PCT Pub. Date: Oct. 24, 2013

(65) Prior Publication Data
US 2015/0055904 A1    Feb. 26, 2015

(30) Foreign Application Priority Data
Apr. 19, 2012    (DE) .......... 10 2012 206 450

(51) Int. Cl.
| | |
|---|---|
| F16C 33/42 | (2006.01) |
| B21D 53/12 | (2006.01) |
| F16C 33/38 | (2006.01) |
| F16C 33/50 | (2006.01) |
| F16C 33/54 | (2006.01) |
| B21D 39/03 | (2006.01) |
| B23K 26/20 | (2014.01) |
| F16C 19/06 | (2006.01) |
| F16C 19/10 | (2006.01) |
| F16C 19/30 | (2006.01) |

(52) U.S. Cl.
CPC ........... *F16C 33/425* (2013.01); *B21D 39/037* (2013.01); *B21D 53/12* (2013.01); *B23K 26/20* (2013.01); *F16C 33/3812* (2013.01); *F16C 33/3881* (2013.01); *F16C 33/427* (2013.01); *F16C 33/502* (2013.01); *F16C 33/543* (2013.01); *F16C 19/06* (2013.01); *F16C 19/10* (2013.01); *F16C 19/30* (2013.01); *F16C 2226/36* (2013.01); *F16C 2226/78* (2013.01); *Y10T 29/49691* (2015.01)

(58) Field of Classification Search
CPC .......................... F16C 33/427; F16C 33/422
See application file for complete search history.

(56) References Cited

U.S. PATENT DOCUMENTS

| | | | |
|---|---|---|---|
| 1,137,010 | A | 4/1915 | Lockwood |
| 1,365,426 | A | 1/1921 | Spanitz |

(Continued)

FOREIGN PATENT DOCUMENTS

| | | |
|---|---|---|
| CN | 101592190 A | 12/2009 |
| CN | 101749324 A | 6/2010 |
| CN | 201982514 U | 9/2011 |
| DE | 214675 | 5/1908 |

(Continued)

*Primary Examiner* — Thomas R. Hannon
(74) *Attorney, Agent, or Firm* — Volpe and Koenig, P.C.

(57) ABSTRACT

A rolling element guide cage having a ring element which is made from a sheet material and has an axial profiling produced using forming techniques and forms a plurality of successive rolling element guide structures in the circumferential direction. The ring element is composed of at least two flat material ring segments joined to one another successively in the circumferential direction, said segments being joined together in a manufacturing step which precedes the formation of the axial profiling.

9 Claims, 8 Drawing Sheets

(56) References Cited

U.S. PATENT DOCUMENTS

| | | | |
|---|---|---|---|
| 3,239,282 A | 3/1966 | Schroll et al. | |
| 3,820,867 A | 6/1974 | Dickinson et al. | |
| 4,322,879 A * | 4/1982 | Warchol | B21D 53/12 29/898.067 |
| 4,988,217 A * | 1/1991 | Iijima | F16C 33/06 384/273 |
| 5,122,001 A * | 6/1992 | Alling | F16C 33/427 384/523 |
| 2003/0077017 A1 | 4/2003 | Fugel et al. | |

FOREIGN PATENT DOCUMENTS

| | | |
|---|---|---|
| DE | 1575428 | 1/1970 |
| DE | 1625540 | 6/1970 |
| DE | 4425345 | 1/1996 |
| DE | 10011651 | 9/2001 |
| EP | 1837539 | 9/2007 |
| FR | 530949 | 1/1922 |
| FR | 573562 | 6/1924 |
| FR | 573779 | 6/1924 |
| JP | 2003013964 | 1/2003 |

* cited by examiner

ROLLING ELEMENT GUIDE CAGE AND METHOD FOR PRODUCING SAME

FIELD OF THE INVENTION

The invention relates to a rolling body guide cage which is produced as such under the influence of forming production steps from at least one ring element and several guide structures arranged in succession in the circumferential direction and in each case provided to guide rolling bodies. The invention furthermore also relates to a method for manufacturing such a rolling body guide cage.

BACKGROUND

DE 1 625 540 A1 discloses a ball bearing cage which is composed of two axially profiled ring elements. The two ring elements are of identical design and are axially profiled in such a manner that they form spherical cap pockets which are arranged in succession in the circumferential direction and which are connected in each case via bridge portions. The two ring elements are composed in such a manner that they contact one another via their bridge portions, wherein the in each case corresponding spherical cap pockets which face one another then jointly form ball guide pockets into which in each case a ball can be inserted. The two ring elements which contact one another via the bridge portions are welded to one another in the region of the bridge portions by spot weld points. In order to manufacture the ring elements, these are punched out from a sheet metal material and formed in a forming tool such that they obtain the axial profiling required to form the ball guide pockets.

It is disadvantageous in the case of this ball bearing cage that a relatively large amount of waste material is generated when punching out the ring elements from the sheet metal material.

SUMMARY

Proceeding from the disadvantages set out of the known prior art, the object on which the invention is based is therefore to indicate solutions by means of which it is possible to reduce the production costs which arise during manufacture of rolling body guide cages.

According to the invention, this object is achieved by a rolling body guide cage with a ring element which is produced from a sheet metal material and has an axial profiling formed by forming techniques and several rolling body guide structures which are arranged in succession in the circumferential direction, the ring element being composed of at least two flat material ring segments which are joined to one another in succession in the circumferential direction and are connected, in particular welded, to one another in a production step which precedes the formation of the axial profiling.

As a result of this, it is advantageously possible to significantly reduce the cutting waste in the manufacture of rolling body guide cages produced by forming techniques in a manner which can be achieved at relatively low-cost from a process engineering perspective. The invention has been shown to be particularly advantageous in particular in the manufacture of rolling body guide cages with an internal diameter of more than 140 mm since the process costs associated with the formation of three weld joints are, at this diameter, already substantially below the material costs of the cutting waste which has hitherto arisen.

According to one particularly preferred embodiment of the invention, the flat material ring segments placed in succession with one another in the circumferential direction are put together across an engagement zone and in this engagement zone are welded along edge regions which face one other therein. The flat material ring segments are connected to one another according to a particular aspect of the present invention in the region of the engagement zones across positively engaging joint contours. These joint contours form an undercut geometry which as such preliminarily couples the ring elements to one another in the circumferential direction. The geometric profile of the joint contours is preferably selected such that adequate coupling of the ring segments is produced with as short as possible a weld seam length. The joint contours are furthermore preferably configured such that the weld seams taper both towards the ring element inner circumferential edge and towards the ring element outer circumferential edge with as obtuse an angle as possible.

The flat material ring segments are cut out, in particular, punched out according to the invention from a sheet metal material. A relatively high material saving can be achieved according to the invention in that the flat material ring segments are formed as 120° ring segments. Only three weld points are then required for joining together a ring element from such flat material ring segments. The 120° segments can be punched out in close succession from a sheet metal strip. In the case of this punching-out step, the circular arc-like inner and outer edges as well as the joint geometries can be cut out in one step.

The concept according to the invention of the production of the rolling body guide cage from a welded ring segment is suitable both for the manufacture of radial bearing cages and for the manufacture of axial bearing cages, in particular cages of groove and angular ball bearings. Particularly in the case of the manufacture of rolling body guide cages for groove and angular ball bearings, the rolling body guide cage can be structured such that it is composed of a first ring element and a structurally identical second ring element positioned in mirror-symmetry. The per se structurally identical ring elements are preferably put together in such a manner that the weld points formed between the ring segments of the ring elements of both ring elements are offset with respect to one another in the circumferential direction, i.e. a weld point is overlapped by an unwelded point.

In terms of the method, the object indicated above is also achieved according to the invention by a method for manufacturing a rolling body guide cage from a ring element which is produced from a sheet metal material and obtains an axial profiling in the context of a forming step, wherein the rolling body guide cage forms several rolling body guide structures arranged in succession in the circumferential direction and wherein, in the context of a method step which precedes the forming step, the ring element is composed of at least two flat material ring segments which are joined to one another in succession in the circumferential direction.

According to a particularly preferred embodiment of the method according to the invention, these flat material ring segments are welded to one another in the region of a joint formed by these flat material ring segments.

The formation of the weld point is preferably performed by laser welding. As a result of this, a high-strength weld point is produced with a low degree of welding distortion. Alternatively to this, it is also possible to this end to form the weld point as a pressure welding point. To this end, it is possible to retain local accumulations of material in the region of the weld point which are formed, for example, by bead portions which can be generated when punching out the ring elements.

The ring segments can be produced in such a manner that they initially have a slight oversize and are initially further cut and where necessary calibrated after welding in the context of a contouring step. However, the ring segments can in principle also be cut to their final dimensions in terms of their material width and are subsequently only formed and where necessary punched internally.

It is possible to punch out the ring segment from a sufficiently wide strip material and thereby push by means of the punching die directly into a positioning device, for example an annular groove of a rotary plate. The rotary plate is pivoted by a corresponding degree of angle of e.g. 120° after insertion of the ring segment and the next ring segment is punched out from the strip material and pushed back into the annular groove of the rotary plate, wherein said ring segment comes into engagement with the connection geometry of the ring element which already lies in the annular groove. After a further rotation of the rotary plate, the third ring segment is punched from strip material and is inserted into the free annular groove portion, wherein said ring segment now comes into engagement with the two ring elements which already lie in the annular groove. Even prior to the introduction of the third ring segment, the ring segments already located in the annular groove can be welded in the rotary plate. After the third ring segment has been inserted and thus a complete ring element lies in the annular groove, the two remaining weld points can be formed. The finished welded ring element is then ejected from the annular groove of the rotary plate and the process is continued again. The punching and welding steps can be carried out such that these overlap chronologically. During the formation of the last two weld points on the respective ring element, strip material can be supplied and where necessary also be punched, wherein the ring segment formed in this manner is moved into the annular groove either only after emptying of the rotary plate or a further rotary plate is supplied. The welding is preferably carried out by a laser beam guided in a path-controlled manner. The welding can where necessary be carried out with the addition of welding material, in particular via a welding wire. The weld seam is, however, preferably formed by only local fusing of the material along the joint edges.

It is thus possible to still join together the ring segments in the context of the workpiece movement to be attributed to the punching process to form a ring segment. In the context of this joining process, the ring segments can also initially be put together only positively in the rotary plate and then lifted out of the rotary plate and moved as prejoined ring elements into a welding station.

It is furthermore possible to join together the initially punched out or otherwise cut out ring segments with alignment of the edges to form a stack or ring segment block and then supply this to a welding station in which the ring segments are inserted, for example, again into an annular groove of a rotary plate and thereby come into engagement with one another via their head and tail geometries.

A particularly high-quality design of the weld connection points can be achieved in that, prior to the punching out of the ring segment or during punching out, a material bead close to the edge is generated which then provides in the context of carrying out the welding process a material volume which enables a complete filling out of the weld seam so that no chamfer is formed in the region of the weld point or any other cross-sectional weakening is produced.

BRIEF DESCRIPTION OF THE DRAWINGS

The rolling body guide cage formed according to the invention is explained in greater detail below in several preferred embodiments with reference to the enclosed drawings. In these drawings.

DETAILED DESCRIPTION OF THE PREFERRED EMBODIMENTS

Figure 1:
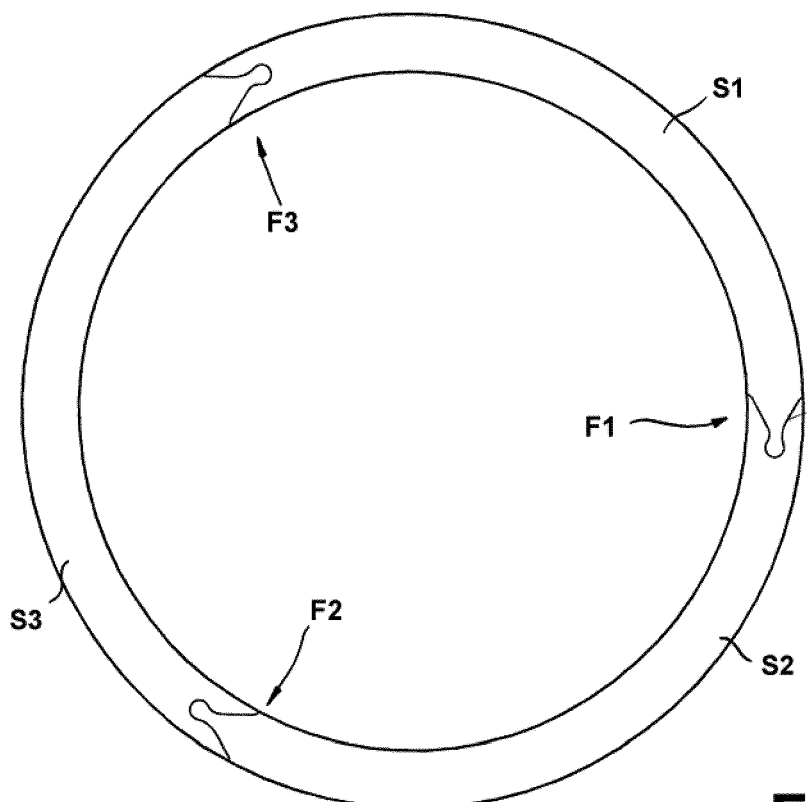
FIG. 1 shows a sketch in order to illustrate a ring element used according to the invention to form a rolling body guide cage, which ring element is composed of several ring segments which are welded to one another.

FIG. 1 shows in the form of a top view a ring element which as such is further processed in the context of the following working steps, in particular a forming step to form a rolling body guide cage, wherein the ring element then in the context of the forming step obtains an axial profiling and in general a geometry in which it forms several rolling body guide structures arranged in succession in the circumferential direction.

The ring element shown here is produced from a sheet metal material and is composed of at least three flat material ring segments S1, S2, S3 which are joined to one another in succession in the circumferential direction. Said flat material ring segments S1, S2, S3 are joined together and here furthermore welded together via joints F1, F2, F3.

Flat material ring segments S1, S2, S3 which are apparent here and which are placed in succession with one another in the circumferential direction are welded along the edge regions which face one another within joints F1, F2, F3. Flat material ring segments S1, S2, S3 are configured in the region of joints F1, F2, F3 such that said joints F1, F2, F3 form engagement zones within which flat material ring segments S1, S2, S3 are connected to one another via joint contours which engage positively in one another. These joint contours form, as is apparent here, an undercut geometry which as such at least preliminarily couples flat material ring segments S1, S2, S3 to one another in the circumferential direction. The geometric profile of the joint contours is concretely selected here so that adequate coupling of flat material ring segments S1, S2, S3 is produced.

Figure 2:
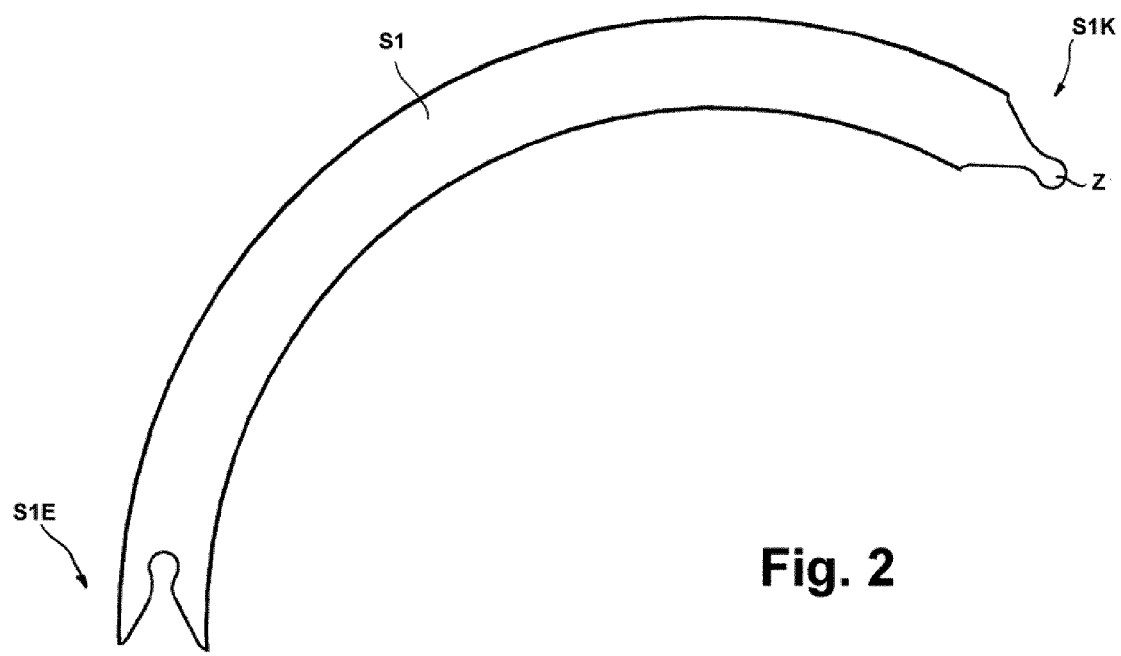
FIG. 2 shows a sketch in order to illustrate the structure of a ring segment used to form the ring element according to FIG. 1.

FIG. 2 illustrates the structure and the component geometry of an individual flat material ring segment S1. Flat material ring segment S1 is cut out from a sheet metal material in such a manner that this ring segment forms a 120° ring segment. Only three weld points are required for joining together a ring element composed of such flat material ring segments, as is apparent in FIG. 1. The 120° segments can be punched out from a sheet metal strip in close superficial succession. In the case of this punching out step, the circular arc-like inner and outer edges and the joint geometries are cut out in one step. Flat material ring segment S1 forms a head portion S1K and a head insert portion S1E. The outer contour of head portion S1K and the inner contour of the head insert portion are matched to one another so that both flat material ring segments sit in one another under slight elastic tension during insertion of head portion S1K of an adjoining flat material ring segment into head insert portion S1E. In so far as the joined together flat material ring segments are welded, it is possible to begin with the formation of the weld seam at a point which makes it possible that, during the weld seam formation, the ring segments to be connected to one another come closer to one another as a result of elastic pretensioning or also as a result of thermal influences. The pretensioning can also be selected such that it prevents a thermal moving part of the edge regions to be welded. In the case of the exemplary embodiment shown here, it is in particular possible to begin with the formation of the weld seam at the inner region of the joint contour, i.e. at the edge of tongue tip Z of the head portion, and form the weld seam in two steps from the inner region towards the outer or inner edge of the ring element.

Figure 3:
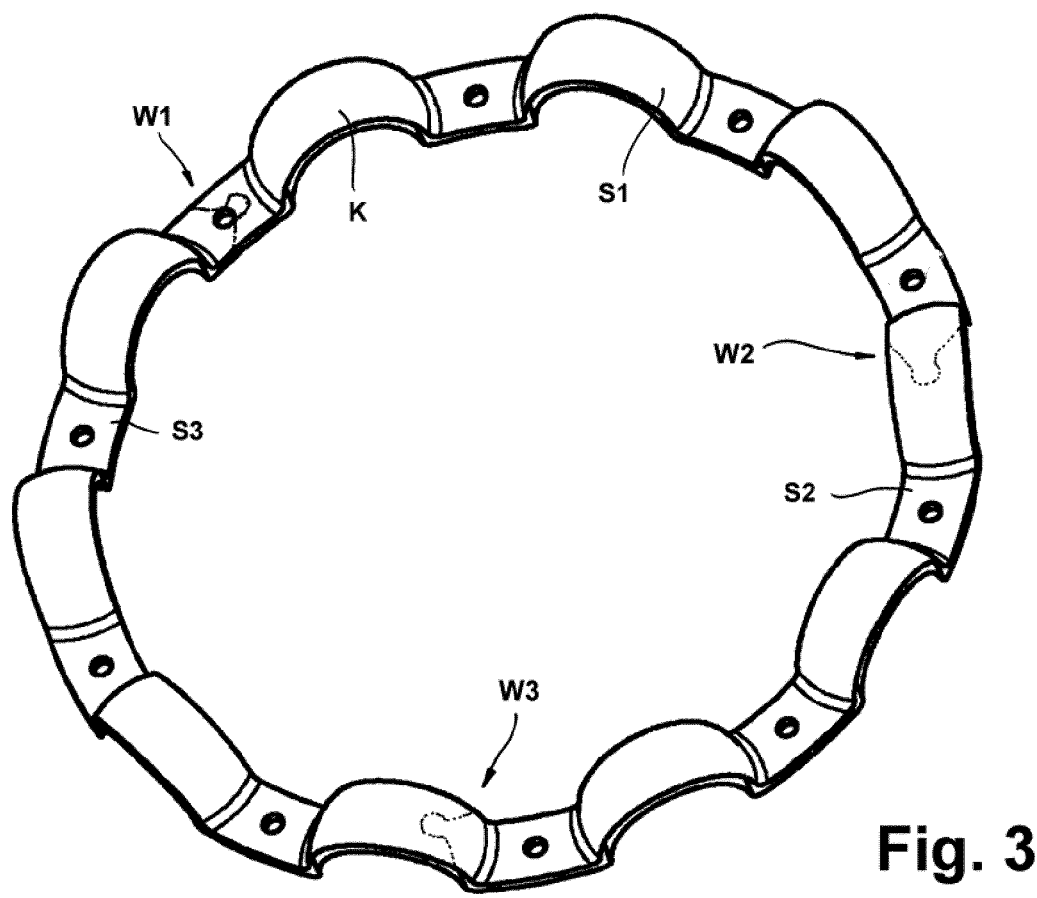
FIG. 3 shows a perspective illustration of a cage part, which is produced in the context of a forming step from a ring element according to FIG. 1, of a two-part ball bearing cage.

FIG. 3 shows a ring element for a rolling body guide cage which is produced by forming from a composed ring element according to FIG. 1. Weld points W1, W2, W3 are indicated in the ring element shown here, along which weld points W1, W2, W3 individual ring segments S1, S2, S3 are welded to one another in a forming step which precedes the plastic forming. This ring element is put together with a further ring element of an identical design to form a cage for a groove ball bearing. The ring element shown here forms several spherical cap pockets K which are arranged in succession in the circumferential direction and then form ball guide pockets in interaction with a ring element of identical design arranged in mirror-symmetry. The connection of the two combined ring elements can be carried out depending on the design of the ball bearing before or also only after the insertion of the balls into the path space formed between bearing inner ring and bearing outer ring. In the case of a groove ball bearing, the connection of the two ring elements is typically only carried out after insertion of the balls into the path space.

Figure 4:
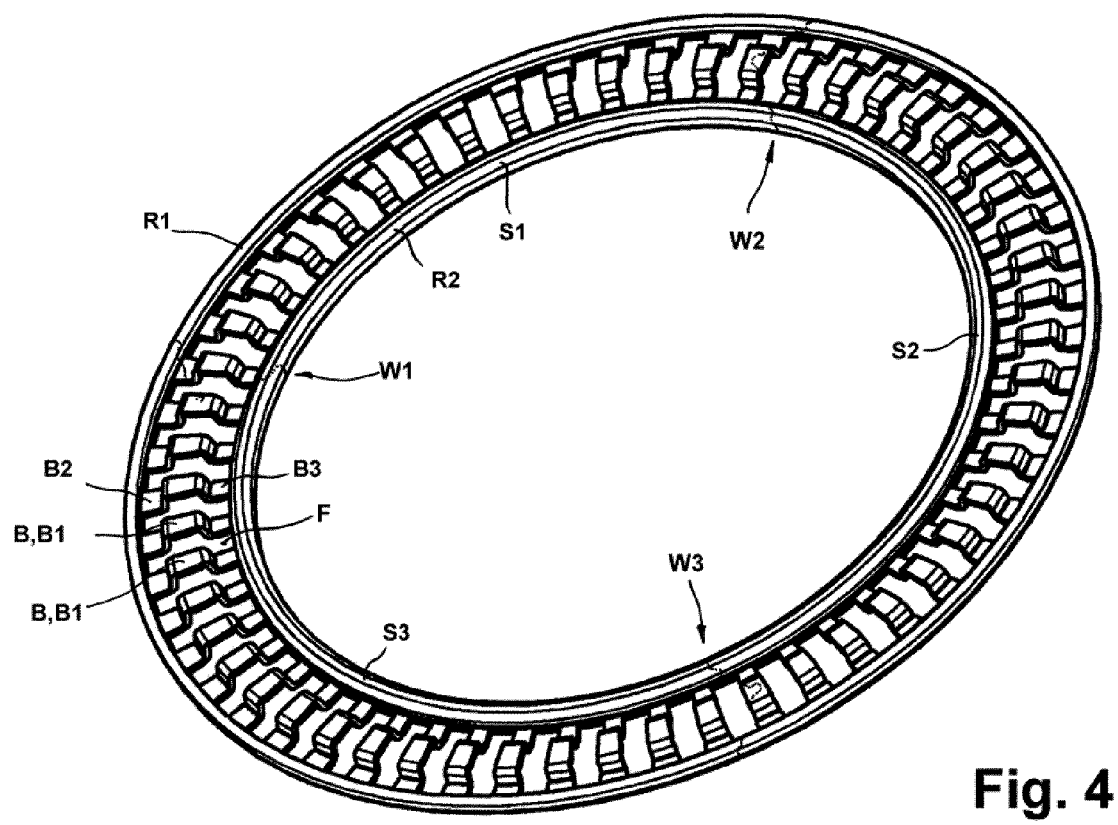
FIG. 4 shows a perspective illustration of an axial needle bearing cage which is produced in the context of a forming step from a ring element according to FIG. 1.

FIG. 4 shows a further embodiment of a ring element according to the invention for a rolling body guide cage which is produced in a similar manner to the variant according to FIG. 3 by forming from a combined ring element according to FIG. 1. In the ring element shown here, weld points W1, W2, W3 are in turn indicated along which individual ring segments S1, S2, S3 are welded to one another in a forming step which precedes plastic forming. The rolling body guide cage shown here is formed as an axial cylinder roller guide cage. This rolling body guide cage forms several rolling body guide windows F which are arranged in succession in the circumferential direction and are separated from one another by guide webs B. Guide webs B are axially profiled and form a middle stage B1 and connecting bridges B2, B3. Outer edge region R1 of the rolling body guide cage forms an angle profile in the axial section. Inner edge region R2 of the rolling body guide cage also forms an angle profile in the axial section. It is possible, by forming, to enclose an additional wire ring element in the inner and/or outer edge region R1, R2 of the ring element, which wire ring element increases the mechanical strength of the ring element, in particular also in the region of weld points W1, W2, W3.

Figure 5:
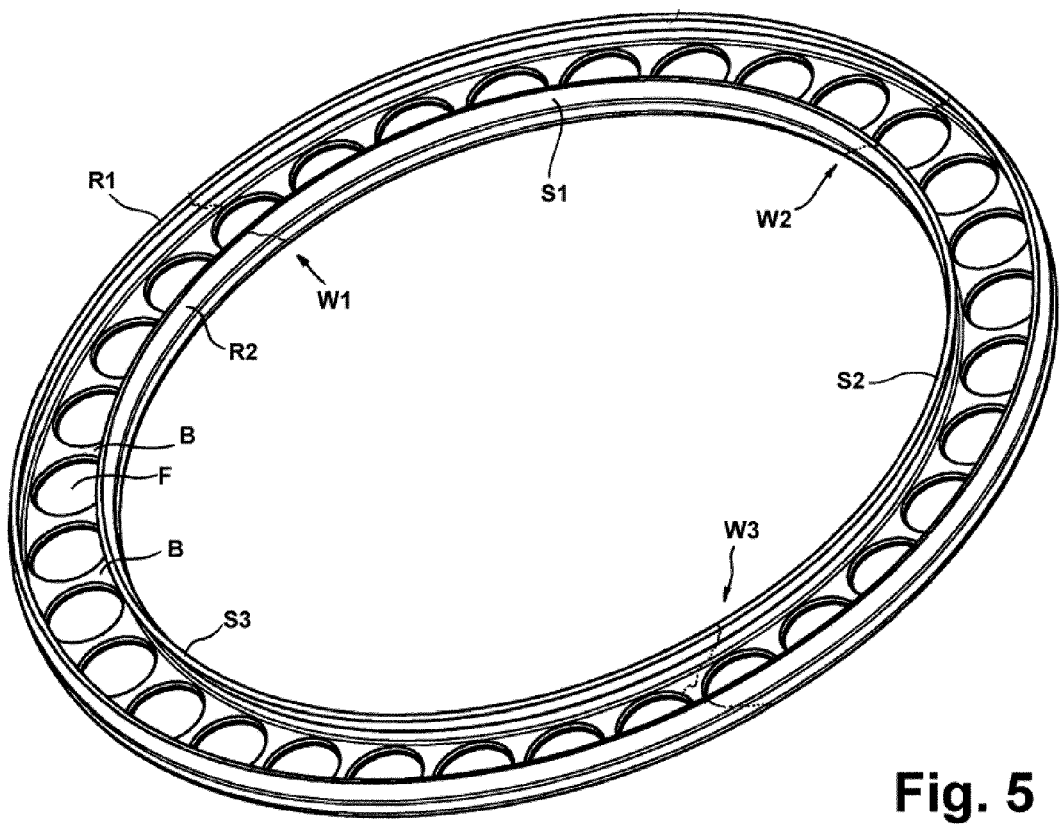
FIG. 5 shows a perspective illustration of a cage, which is produced in the context of a forming step from a ring element according to FIG. 1, for an axial ball roller bearing.
Figure 6:
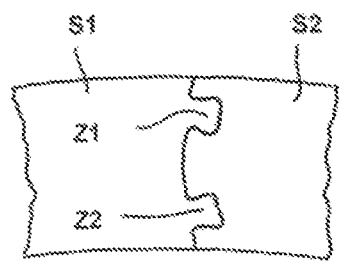
FIG. 6 shows a sketch in order to illustrate a further variant of the joint contour produced, preferably welded over between two ring segments.

FIG. 5 shows a third embodiment of a ring element according to the invention for a rolling body guide cage which is produced in a similar manner to the variants according to FIGS. 3 and 4 also by forming from a combined ring element according to FIG. 1. In the ring element shown here, weld points W1, W2, W3 are in turn indicated along which individual ring segments S1, S2, S3 are welded to one another in a forming step which precedes plastic forming. The rolling body guide cage shown here is formed here as a ball guide cage for an axial ball bearing. This ball guide cage forms several rolling body guide windows F which are arranged in succession in the circumferential direction and are in turn separated from one another by guide webs B. Rolling body guide windows F are punched into the ring element formed by forming techniques in a machining step which follows the forming. Outer edge region R1 of the ball guide cage forms, in a similar manner to the variant according to FIG. 4, an angle profile in the axial section. Inner edge region R2 of the rolling body guide cage also forms an angle profile in the axial section. It is also possible here, by forming, to enclose an additional wire ring element in inner and/or outer edge region R1, R2 of the ring element, which wire ring element increases the mechanical strength of the cage and bridges weld points W1, W2, W3. FIG. 6 illustrates, in the form of a top view of a portion of a ring element, an alternative joint contour by which two ring segments S1, S2 arranged in succession can be connected to one another. This contour is characterized by a small widening of the gap during the welding process and requires a small amount of material in the circumferential direction. The joint contour forms two engagement tongues Z1, Z2 which are anchored positively in a corresponding complementary contour. The run-out of the joint edges to the inner or outer edge is relatively obtuse, it being almost 90° here.

Figure 7:
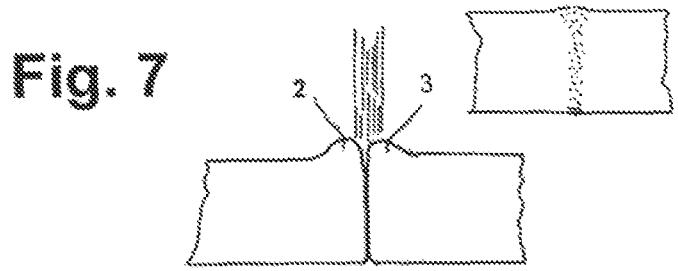
FIG. 7 shows a sketch in order to illustrate an exemplary embodiment in which an accumulation of material is formed along the edges to be welded by plastic forming.

FIG. 7 illustrates in the form of a cross-sectional sketch how, by forming beads 2, 3 on the sheet metal material, a certain degree of material accumulation can be retained which makes it possible, after fusing thereof, in particular by laser welding, to generate a substantially flat weld point. Beads 2, 3 can be formed in the context of the punching process or a preceding embossing step by plastic material forming.

Figure 8A:
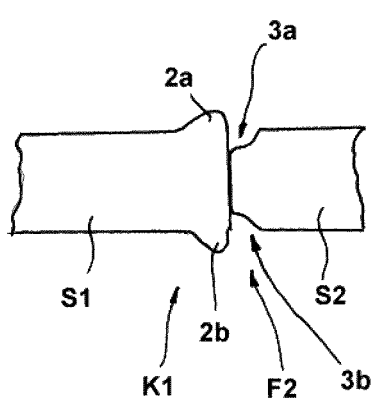
FIG. 8a shows a first sketch in order to illustrate an exemplary embodiment in which, by local plastic forming, axial securing of the ring segments which are positively interlocked in one another in the circumferential direction can also be achieved.
Figure 8B:
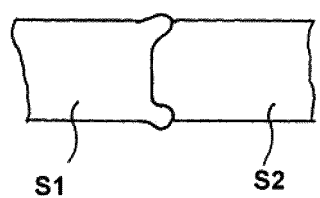
FIG. 8b shows a second sketch in order to illustrate an exemplary embodiment in which, by local plastic forming, axial securing of the ring segments which are positively interlocked in one another in the circumferential direction can also be achieved.

FIGS. 8a and 8b also illustrate in the form of a cross-sectional sketch how axial securing of ring segments S1, S2 can be achieved by local material forming. Beads 2a, 2b can be formed, for example, along head edge K1 of ring segment S1 by a preceding embossing step and in each case depressions 3a, 3b can be formed at foot edge F2 of adjoining ring segment S2. After joining together of ring segments S1, S2, beads 2a, 2b are rolled over and deformed into the state shown in FIG. 8b. In this state, both ring segments S1, S2 are axially secured with respect to one another. The connection point formed in this manner can where necessary be welded over.

Figure 9:
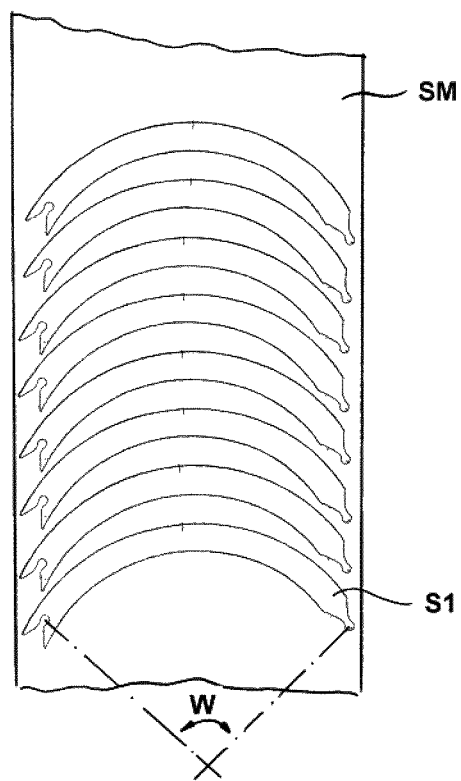
FIG. 9 shows a sketch in order to illustrate the cut position of the ring segments punched out according to the invention from a strip material in order to form a joined together ring element for a rolling body guide cage.

FIG. 9 shows by way of example how a ring segment S1 can be punched out of a strip material SM in close succession. Punched out ring segments can joined together directly after the punching step to form a ring element and then welded. In the case of the exemplary embodiment shown here, ring segment S1 forms a segment angle W of 120°. In so far as the ring element is formed from three segments S1 punched out from strip material SM in direct succession, it is ensured that substantially the same material properties are ensured within a ring element. This is particularly advantageous for a uniform formation of the weld points.

LIST OF REFERENCE NUMBERS

2a Bead
2b Bead
3a Depression
3b Depression
B Guide web
B2 Connecting bridge
B3 Connecting bridge
F1 Joint
F2 Joint
F3 Joint
K Spherical cap pocket
K1 Head edge
R1 Outer edge region
R2 Inner edge region
Flat material ring segment
S2 Flat material ring segment
S3 Flat material ring segment
S1K Head portion
S1E Head insert portion
W Segment angle
W1 Weld points
W2 Weld points
W3 Weld points
SM Strip material

The invention claimed is:

1. A rolling body guide cage comprising a ring element which is produced from a sheet metal material and has a formed axial profiling and several rolling body guide structures which are arranged in succession in a circumferential direction, wherein the ring element is comprised of at least two flat material ring segments which are joined to one another in succession in the circumferential direction by connections prior to formation of the axial profiling, and the flat material ring segments are connected to one another in a region of engagement zones across positively engaging joint contours.

2. The rolling body guide cage as claimed in claim 1, wherein the flat material ring segments are welded to one another at weld points.

3. The rolling body guide cage as claimed in claim 1, wherein the flat material ring segments placed in succession with one another in the circumferential direction are put together across an engagement zone and include welds along edge regions which face one other in the engagement zone.

4. The rolling body guide cage as claimed in claim 1, wherein the flat material ring segments are cut out from the sheet metal material.

5. The rolling body guide cage as claimed in claim 1, wherein the flat material ring segments are formed as 120° ring segments.

6. A rolling body guide cage comprising a ring element which is produced from a sheet metal material and has a formed axial profiling and several rolling body guide structures which are arranged in succession in a circumferential direction, wherein the ring element is comprised of at least two flat material ring segments which are joined to one another in succession in the circumferential direction by connections prior to formation of the axial profiling, wherein the rolling body guide cage is embodied as a radial bearing cage and is comprised of a first one of the ring elements and a structurally identical second one of the ring elements positioned in mirror-symmetry.

7. The rolling body guide cage as claimed in claim 6, wherein the ring elements are put together with weld points formed between the ring segments of the ring elements that are offset with respect to one another in the circumferential direction.

8. A method for manufacturing a rolling body guide cage from a ring element which is produced from a sheet metal material, comprising forming an axial profiling in a forming step including several rolling body guide structures arranged in succession in a circumferential direction and in a method step which precedes the forming step, forming the ring element of at least two flat material ring segments by joining the flat material ring segments to one another in succession in the circumferential direction, with the flat material ring segments being connected to one another in a region of a joint formed by the flat material ring segments, and connecting the flat material ring segments to one another in a region of engagement zones across positively engaging joint contours.

9. The method as claimed in claim 8, wherein the connection is formed by a weld point carried out by laser welding.

* * * * *